United States Patent [19]

Dolansky et al.

[11] Patent Number: 4,639,820

[45] Date of Patent: Jan. 27, 1987

[54] PROTECTIVE ELEMENT FOR DISTRIBUTOR STRIPS

[75] Inventors: Franz Dolansky, Munich; Ewald Steiner, Berg, both of Fed. Rep. of Germany

[73] Assignee: Siemens Aktiengesellschaft, Berlin and Munich, Fed. Rep. of Germany

[21] Appl. No.: 719,342

[22] Filed: Apr. 3, 1985

[30] Foreign Application Priority Data

Apr. 3, 1984 [DE] Fed. Rep. of Germany ....... 3412421

[51] Int. Cl.[4] ................................................ H02H 3/22

[52] U.S. Cl. .................................... 361/124; 361/119; 361/103; 361/355

[58] Field of Search .................... 361/86, 87, 103, 118, 361/119, 124, 355, 361; 339/45 M, 252 F, 253 F, 198 G, 198 P, 198 S; 337/34, 17

[56] References Cited

U.S. PATENT DOCUMENTS

| | | | |
|---|---|---|---|
| 3,818,271 | 6/1974 | Baumbach | 361/119 X |
| 4,071,876 | 1/1978 | Benson et al. | 361/119 |
| 4,159,500 | 6/1979 | Baumbach et al. | 361/119 |
| 4,168,515 | 9/1979 | Baumbach | 361/119 X |
| 4,345,294 | 8/1982 | Forberg et al. | 361/119 |
| 4,527,215 | 7/1985 | Wessing | 361/124 |

*Primary Examiner*—A. D. Pellinen
*Assistant Examiner*—Derek S. Jennings
*Attorney, Agent, or Firm*—Hill, Van Santen, Steadman & Simpson

[57] ABSTRACT

A protective element system includes a distributor strip and a protective element pluggable into the distributor strip. The distributor strip has a plurality of terminal posts for insulation stripping connection to electrical conductors. A plurality of upwardly open receptacle chambers are provided in an upper part of the distributor strip. In each chamber, a pair of contact springs are connected to respective terminal posts at outer sides of the respective receptacle chamber. A portion of a grounding rail projects into each of the receptacle chambers between respective contact springs in the associated chamber. The protective element includes a plug portion for insertion into one of the receptacle chambers of the distributor strip. An upwardly open receptacle chamber is provided in the protective element for accommodating a pair of surge arresters. Contact springs are positioned opposite one another at outer portions of the receptacle chamber. A grounding rail projects into the receptacle chamber. The contact springs and grounding rail are connected via the plug portion to the respective contact springs and grounding rail of the respective receptacle chamber in the distributor strip in which the protective element is plugged. Each contact spring in the chamber of the protective element is connected to a screw terminal.

4 Claims, 3 Drawing Figures

PROTECTIVE ELEMENT FOR DISTRIBUTOR STRIPS

RELATED APPLICATIONS

Attention is drawn to related applications U.S. Ser. Nos. 719,330, filed Apr. 3, 1985 and 719,331, filed Apr. 3, 1985, copending herewith, and by the same inventors of the instant application.

BACKGROUND OF THE INVENTION

The invention relates to a protective element for distributor strips formed of a plurality of double terminal posts allowing non-stripped connection of electrical conductors. Upwardly open receptacle chambers for surge arresters are provided in the upper part thereof. Contact springs connected to the respective double terminal posts are disposed at the outer sides of the receptacle chambers and parts of a grounding rail project into the receptacle chamber between two respective contact springs lying opposite one another.

Such distributor strips are usually designed for ten double leads and, on the basis of their double posts, serve for the formation of jumpering restart points. Over and above this, they enable a surge arrester to be allocated to an arbitrary lead as required. Such distributor strips are also used in final pole terminals or in line branchers. However, the problem frequently arises that individual subscribers must be connected via drop-wires—i.e. plastics-insulated double lead lines having a large wire cross-section. Due to their large cross-section, these double lead lines cannot be directly connected to the double terminal posts of the distributor strips.

SUMMARY OF THE INVENTION

An object of the present invention is to specify an auxiliary means for such distributor strips which, given simultaneous protection against surge voltages, enables a connection of large cross-section leads to the above-described distributor strips in a simple fashion. This object is achieved by a protective element which has the lower part of the protective element designed as a plug-in part insertable into a receptacle chamber of the distributor strip. An upwardly open receptacle chamber for surge arresters is provided in the upper part of the protective element, contact springs are disposed at the outer sides of the receptacle chambers, and parts of a grounding rail project into the receptacle chamber between respective contact springs lying opposite to one another. The contact springs and the grounding rail are connected via the plug-in part to the contact springs and the grounding rail of the corresponding receptacle chamber of the distributor rail. Each contact spring is connected to a screw post positioned outside of the receptacle chamber.

The connection of individual drop-wire subscribers is possible in a simple fashion by employing the protective element of the invention in the initially described distributor strips, for example in final pole terminals. The corresponding subscriber can be connected via screw posts to the protective element which is suitable for the acceptance of surge arresters. The protective element is then simply plugged into the corresponding receptacle chamber of the distributor strip.

Since, given drop-wire subscribers, a protection against overcurrents is frequently also required in addition to a protection against overvoltages, a further development of the protective element of the invention, the parts of the contact springs projecting into the receptacle chamber are designed in right-angled fashion such that the free leg is respectively situated proximate to the floor, and its outer edge is pressed against the grounding rail. The length of the free legs isdimensioned such that, after the insertion of a surge arrestor and of a solder ring, the distance between its outer edge and the grounding rail is less than the thickness of the solder ring.

As a result of this development of the protective element, when the solder ring melts given an overcurrent, the contact spring connected to the corresponding lead forms a contact to the grounding rail, and thus the corresponding lead is applied to ground.

DESCRIPTION OF THE PREFERRED EMBODIMENTS

Figure 1:
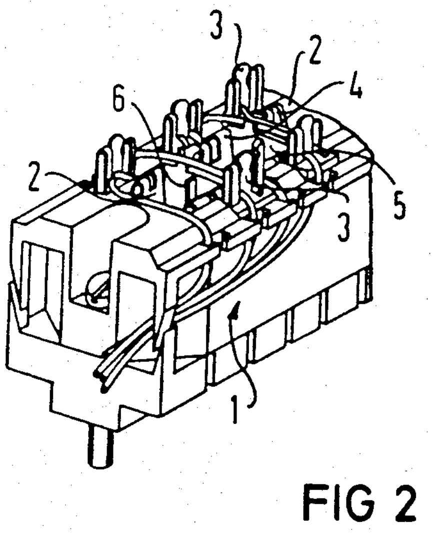
FIG. 1 is a perspective partial view of a distributor strip wherein the protective element of the invention is to be employed.

FIG. 1 shows in a partial perspective view a distributor strip 1 wherein the protective element of the invention is to be employed. In its upper part, this distributor strip 1 contains receptacle chambers 2 for the acceptance of surge arresters. Situated at upper longitudinal sides of the distributor strip are a plurality of double terminal posts 3 connected to contact springs 4 projecting-in at the neighboring side walls of the receptacle chambers 2. Respective parts of a grounding rail are disposed between these contact springs. The individual receptacle chambers 2 are separated from one another by partitions 5.

Figure 2:
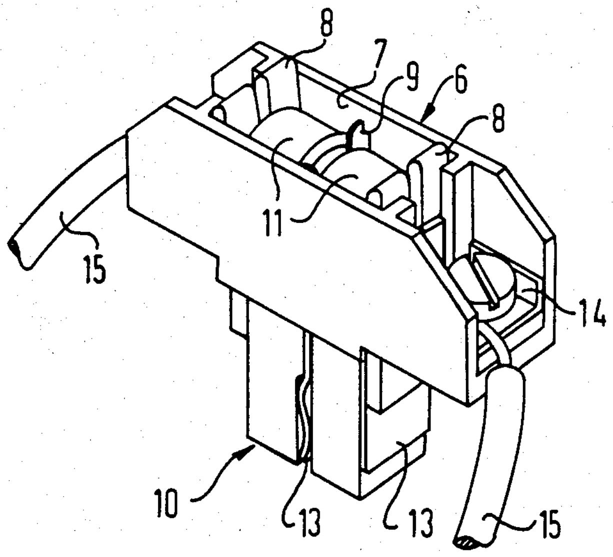
FIG. 2 is a perspective partial view of a protective element of the invention.
Figure 3:
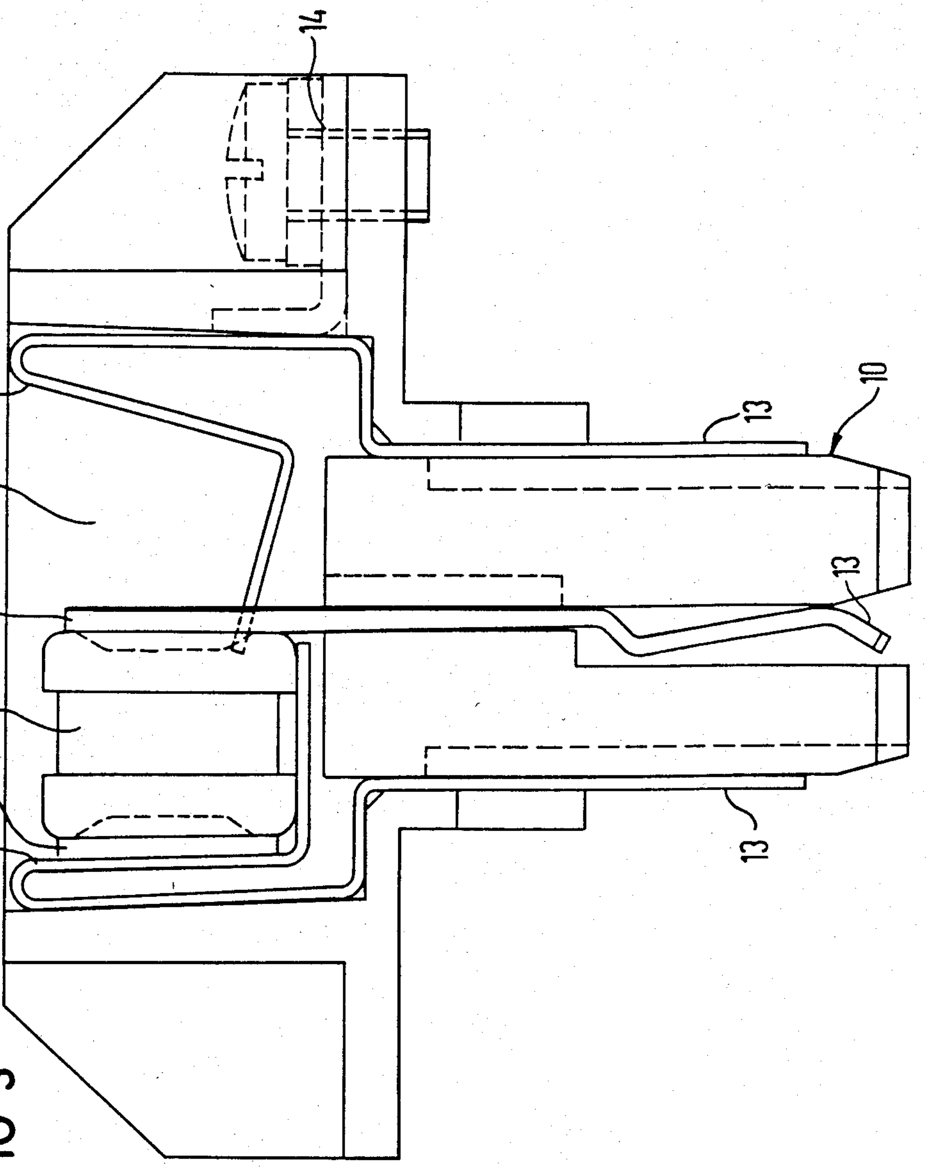
FIG. 3 is a section through a protective element of the invention.

FIGS. 2 and 3 show the protective element 6 of the invention. This protective element 6 is composed, among other things, of the plug part 10. This plug part 10 is fashioned such that it can be respectively inserted into a receptacle chamber 2 of the distributor strip 1 and has contacts 13 contacting both the contact springs as well as the grounding rail in the receptacle chamber 2 of the distributor strip 1. A receptacle chamber 7 into which surge arresters 11 can be inserted is provided in the upper part of the protective element. In terms of structure, the receptacle chamber 7 is essentially identical to the receptacle chambers of the distributor strip. The contact springs 8 (shown in FIG. 3 as being integral with contacts 13), between which parts of a grounding rail 9 project into the receptacle chamber 7, are disposed at the two outer sides. The contact springs 8, as well as the grounding rail 9, are connected via the contacts 13 of the plug part 10 to the contact springs and to the grounding rail of the corresponding receptacle chamber in the distributor strip. The two contact springs 8 of the protective element 6 are respectively connected to a screw terminal 14 to which a lead 15 having a large cross-section can be connected.

The parts of the contact springs 8 projecting into the receptacle chamber 7 can be shaped in right-angled fashion such that the downwardly disposed free leg—after insertion of a surge arrester 11 and of a solder ring 12—has a defined distance from the grounding rail 9 which is smaller than the thickness of the solder ring 12. When the solder ring melts as a consequence of an overcurrent, then the outer edge of the downwardly proceeding, free leg of the contact spring 8 is brought into contact with the grounding rail 9. In other words, the lead connected to the contact spring 8 is directly applied to ground potential given overcurrent. In addition to a protection against overvoltage, a protection against overcurrents is thus assured in a simple fashion.

Although various minor changes and modifications might be proposed by those skilled in the art, it will be understood that we wish to include within the claims of the patent warranted hereon all such changes and modifications as reasonably come within our contribution to the art.

We claim as our invention:

1. A protective element for distributor strips having a plurality of double terminal post means for non-stripped connection of electrical conductors arranged in two rows, a plurality of upwardly open receptacle chamber means being provided between the two rows for receiving respective surge arresters in an upper portion of the distributor strip, contact springs being connected to the respective double terminal post means at outer sides of the receptacle chamber means, and portions of a grounding rail projecting into the receptacle chamber means between the contact springs opposite one another in the chamber means, comprising:

- a lower part of the protective element being designed as a plug means for insertion into at least one of the receptacle chamber means for the distributor strip;
- an upwardly open receptacle chamber means being provided in the protective element for accommodating surge arresters at an upper part of the protective element;
- contact springs opposite one another at sides of the receptacle chamber means and a grounding rail having a portion projecting into the receptacle chamber means between the contact springs;
- the contact springs and the grounding rail portion being connected via the plug means to the contact springs and the grounding rail of a receptacle chamber means of the distributor strip in which the protective element is plugged; and
- each contact spring in the protective element being connected to a screw terminal positioned outside of the receptacle chamber means in the protective element.

2. A protective element according to claim 1 wherein a portion of each of the contact springs in the receptacle chamber means of the protective element has a free leg portion bent at approximately a right-angle with respect to remaining portions of the contact spring and situated adjacent a floor of the chamber means, and a leading edge of the free leg being pressed in spring-like fashion against the grounding rail when a surge arrester is not present, and a length of the free leg being dimensioned such that with an inserted surge arrester and an associated solder ring, a spacing between said leading edge and the grounding rail is smaller than a thickness of the solder ring.

3. A protective element system, comprising:

- a distributor strip including:
  - a plurality of terminal post means for non-stripped connection to electrical conductors;
  - a plurality of upwardly open receptacle chamber means in an upper portion of the distributor strip;
  - in each chamber means a pair of contact springs being connected to respective terminal post means outwardly of the respective receptacle chamber means;
  - a portion of a grounding rail projecting into each of the receptacle chamber means between respective contact springs in the associated chamber means;
- a protective element including:
  - a plug means at a lower portion of the protective element for insertion into one of the receptacle chamber means of the distributor strip;
  - an upwardly open receptacle chamber means in the protective element for accommodating a pair of surge arresters;
  - contact springs opposite one another at outer portions of the receptacle chamber means; and
  - a grounding rail having a portion projecting into the receptacle chamber means between the two contact springs;
  - the contact springs and the grounding rail being connected via the plug means to the respective contact springs and grounding rail portion of the respective receptacle chamber means in the distributor strip in which the protective element is plugged; and
  - each contact spring in the chamber means of the protective element being connected to a screw terminal positioned outside of the receptacle chamber means.

4. The system of claim 3 wherein the terminals of the protective element comprise screw terminals.

* * * * *